US011209660B2

(12) United States Patent
Fitelson et al.

(10) Patent No.: US 11,209,660 B2
(45) Date of Patent: Dec. 28, 2021

(54) PROJECTING AN IMAGE OF AN OBJECT ON AN IMAGE PLANE

(71) Applicants: Michael Manuel Fitelson, Columbia, MD (US); Yanhua Shih, Ellicott City, MD (US); Jane Noble Sprigg, Cantonsville, MD (US)

(72) Inventors: Michael Manuel Fitelson, Columbia, MD (US); Yanhua Shih, Ellicott City, MD (US); Jane Noble Sprigg, Cantonsville, MD (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 188 days.

(21) Appl. No.: 16/747,284

(22) Filed: Jan. 20, 2020

(65) Prior Publication Data
US 2021/0223560 A1   Jul. 22, 2021

(51) Int. Cl.
*G02B 27/10* (2006.01)
*G02B 27/18* (2006.01)
*H04N 5/372* (2011.01)

(52) U.S. Cl.
CPC ......... *G02B 27/1006* (2013.01); *G02B 27/18* (2013.01); *H04N 5/372* (2013.01)

(58) Field of Classification Search
CPC .............. G02B 27/10; G02B 27/1006; G02B 27/1046; G02B 27/106; G02B 27/18; H04N 5/372
See application file for complete search history.

(56) References Cited

U.S. PATENT DOCUMENTS

| 4,810,978 A | 3/1989 | Sato et al. |
| 5,247,183 A | 9/1993 | Tocci |

(Continued)

FOREIGN PATENT DOCUMENTS

| JP | 2011114289 A | 6/2011 |
| WO | 2018050948 A1 | 3/2018 |

OTHER PUBLICATIONS

Peng, et al.: "Delayed-Choice Quantum Eraser with Thermal Light"; Physical Review Letters, DOI: 10.1103/PhysRevLett.112.180401, PACS Nos. 03.65.Ta, 42.50.Dv, pp. 180401-1 thru 180401-5.

(Continued)

*Primary Examiner* — Joseph P Martinez
(74) *Attorney, Agent, or Firm* — Tarolli, Sundheim, Covell & Tummino LLP (57) ABSTRACT

A system for projecting an image of an object on an image plane can include a beam splitter that outputs a first image beam and a second image beam in response to an input image beam, wherein the input image beam comprises an image of an object. The system can also include a Fourier transform lens to transform the second image beam into a Fourier image beam. The system can further include a bucket detector that is aligned in a light path of the Fourier image beam. The bucket detector asserts a control signal in response to detecting a threshold number of photons with an elevated probability of having a high spatial frequency within a timeframe and to de-assert the control signal in response to detecting less than the threshold number of photons with an elevated probability of having a high spatial frequency within the timeframe.

20 Claims, 4 Drawing Sheets

(56) References Cited

U.S. PATENT DOCUMENTS

| | | | |
|---|---|---|---|
| 6,480,283 | B1 | 11/2002 | Williams et al. |
| 7,292,342 | B2 | 11/2007 | Zaugg |
| 7,812,303 | B2 | 10/2010 | Meyers et al. |
| 9,268,900 | B1 | 2/2016 | Ungar |
| 2010/0140458 | A1 | 6/2010 | Meyers et al. |
| 2012/0081687 | A1* | 4/2012 | Burrow ............... G03F 7/70408 355/71 |
| 2012/0327287 | A1 | 12/2012 | Meyers et al. |
| 2017/0013213 | A1 | 1/2017 | Shih et al. |

OTHER PUBLICATIONS

Chen, et al.: "100% correlation of chaotic thermal light"; Physical Review A 88, 023808 (2013), DOI: 10.1103/PhysRevA.88.023808, PACS Nos. 42.30.Va, 03.67.-a, 03.65.-w, pp. 023808-1 thru 023808-7.

Sprigg, et al.: "Super-resolution imaging using the spatial-frequency filtered intensity fluctuation correlation" Scientific Reports, 6:38077/ DOI: 10.1038/srep38077; pp. 1-7.

Pittman, et al.: "Optical imaging by means of two-photon quantum entanglement"; Physical Review A, vol. 52, No. 5, Nov. 1995; pp. 1-4.

Vaziri, et al.: "Experimental Two-Photon, Three-Dimensional Entanglement for Quantum Communication"; Physical Review Letters, vol. 89, No. 24, Dec. 9, 2002; pp. 240401-1 thru 240401-4.

Moreau, et al.: "Ghost Imaging Using Optical Correlations"; Laser & Photonics Reviews 2018, 12, 1700143 (1-11) www.lpr-journal.org.

Australian Examination Report for Application No. 2019249062 dated Mar. 11, 2021.

* cited by examiner

PROJECTING AN IMAGE OF AN OBJECT ON AN IMAGE PLANE

TECHNICAL FIELD

This disclosure relates to imaging. More particularly, this disclosure relates to a system for projecting an image of an object on an image plane.

BACKGROUND

In mathematics, physics, and engineering, spatial frequency is associated with the Fourier Transform of the spatial image. The spatial frequency is a measure of how often sinusoidal components (as determined by a Fourier transform) of the structure repeat per unit of distance. Spatial frequency is measured in cycles per meter. In image-processing applications, spatial frequency can be expressed in units of cycles per millimeter or equivalently line pairs per millimeter.

An image sensor or image plane is a sensor that detects and conveys information used to make an image. An image plane does so by converting the variable attenuation of light waves (as they pass through or reflect off objects) into beams, small bursts of current that convey the information. The waves can be light or other electromagnetic radiation. Image planes are used in electronic imaging devices of both analog and digital types, which include digital cameras, camera modules, camera phones, optical mouse devices, medical imaging equipment, night vision equipment such as thermal imaging devices, radar, sonar and others.

A charge-coupled device (CCD) is a device for the movement of electrical charge, usually from within the device to an area where the charge can be manipulated, such as conversion into a digital value. This is achieved by "shifting" the beams between stages within the device one at a time. CCDs move charge between capacitive bins in the device, with the shift allowing for the transfer of charge between bins.

SUMMARY

One example relates to a system for projecting an image of an object on an image plane. The system can include a beam splitter that outputs a first image beam and a second image beam in response to an input image beam, wherein the input image beam comprises an image of an object. The system can also include a Fourier transform lens aligned to receive the second image beam and to transform the second image beam into a Fourier image beam. The system can further include a bucket detector that is aligned in a light path of the Fourier image beam. The bucket detector asserts a control signal in response to detecting a threshold number of photons with an elevated probability of having a high spatial frequency within a timeframe and to de-assert the control signal in response to detecting less than the threshold number of photons with an elevated probability of having a high spatial frequency within the timeframe, assertion and de-assertion of the control signal controls a state of an optical window aligned to receive the first image beam and the optical window allows the first image beam to pass to an image plane in a passing state and the optical window blocks of the first image beam in a blocking state.

Another example relates to a system for projecting an image of an object on an image plane. The system can include a pseudo-thermal light source that outputs light with random phases of packets of photons and a beam splitter that outputs a first image beam and a second image beam in response to an input image beam that includes an image of an object situated between the pseudo-thermal light source and the beam splitter. The system can also include a Fourier transform lens aligned to receive the second image beam and to transform the second image beam into a Fourier image beam and a spatial filter aligned to receive the Fourier image beam and occlude photons with a low spatial frequency to provide a filtered Fourier image beam. The system can further include a bucket detector that is aligned to receive the filtered Fourier image beam, wherein the bucket detector asserts a control signal in response to detecting a threshold number of photons within a timeframe and to de-assert the control signal in response to detecting less than the threshold number of photons within the timeframe. Assertion and de-assertion of the control signal controls a state of an optical window aligned to receive the first image beam. The optical window allows light waves of the first image beam to pass to an image plane in a passing state and the optical window blocks light waves of the first image beam in a blocking state.

Yet another example relates to a method for projecting an image of an object on an image plane. The method can include receiving, at a bucket detector, a filtered Fourier image beam that is correlated with an object image beam directed to an image plane, wherein photons in the filtered Fourier image beam have an elevated probability of having a high spatial frequency. The method can include detecting, at the bucket detector, a threshold number of photons in the filtered Fourier image beam within a timeframe. The method can further include asserting, in response to the detecting, a control signal that causes an optical window to switch to a passing state to allow light waves in the object image beam to pass to the bucket detector.

DETAILED DESCRIPTION

This disclosure relates to a system that generates a high resolution image of an object on an image plane by leveraging principles of quantum mechanics. More specifically, the disclosure is related to a system that produces an image by collecting light in an image plane (e.g., a photoresist image plane for lithography, a charged coupled device, etc.) based on spatial frequency of light being collected. More particularly, higher resolution images can be produced by projecting the image on the image plane when the photons of the light have an elevated probability of having a high spatial frequency relative to a mean spatial frequency of the light. The image projected on the image plane can have a resolution that is greater than a resolution achievable with classical techniques.

The system of the present disclosure includes a light source that produces a light beam that passes through an imaging lens. The system also includes a switch connected to an optical window and a bucket detector, wherein the bucket detector controls the switch. Upon passing through the imaging lens the light beam is split into two beams by a beam splitter. Fluctuations of photon spatial frequency in both beams are correlated due to quantum mechanical properties. A first light beam of the two (split) beams is directed on a first light path that terminates at the image plane. The optical window connected to the switch is positioned in the first light path in front of the image plane. The second light beam is directed on a second light path that terminates at the bucket detector. The second light path includes a Fourier transform lens positioned in front of the bucket detector. The Fourier transform lens converts the second light beam into a Fourier transform light beam. A spatial filter (e.g., at a Fourier transform plane of the Fourier transform lens) occludes low spatial frequency photons in the Fourier transform beam to form a filtered Fourier Transform beam. Accordingly, photons in the second light beam that reach the bucket detector (the filtered Fourier transform beam) have an elevated probability of having a high spatial frequency relative to a mean spatial frequency of light beams output by the beam splitter.

The switch sets the optical window (in the first light beam path) to a passing state or a blocking state. In the passing state, the optical window is set to a condition such that the first light beam passes through the optical window to the image plane. In contrast, in the blocking state, the optical window is set to a condition such that the first light beam terminates at the optical window.

As noted, the second path terminates at the bucket detector, such that the bucket detector collects photons provided by the second light beam. Moreover, the bucket detector causes the switch to set the optical window to the passing state in response to detecting a threshold number of photons in the second light beam over a predetermined timeframe (e.g., 1 nanosecond), which denotes that the photons in the second light beam have an elevated probability of having a high spatial frequency over the timeframe. Conversely, the bucket detector causes the switch to set the optical window to the blocking state in response to detecting less than the threshold number of photons in the second light beam during the timeframe, which denotes that the photons in the second light beam have a spatial frequency distribution that is close to the mean (e.g., within one standard deviation) of the spatial frequency of light output by the beam splitter over the timeframe.

The spatial frequency of the first light beam is correlated with the spatial frequency of the second light beam. Accordingly, the optical window is in the passing state (allowing the first light beam to pass to the image plane), at times that the photons of the first light beam have an elevated probability of having a high spatial frequency (since the spatial frequency of photons in the first and second light beams are correlated). Additionally, the optical window is in the blocking state (occluding the first light beam) at times that the photons of the first light beam have a relatively low spatial frequency. In this manner, photons are only passed to the image plane during coincidence time windows wherein photons of the first light beam have an elevated probability of having a high spatial frequency.

By employing the system for projecting an image of an object, photons in the first light beam that have elevated probability of having a high spatial frequency are passed to the image plane. Moreover, by increasing the spatial frequency of the photons absorbed by the image plane, the resolution of the image provided to the image plane is elevated. Accordingly, the system described in the present disclosure employs quantum mechanics (a non-classical approach), namely, the correlation of the spatial frequency of the photons in the first and second light beams to improve the resolution of the image of the object projected on the image plane. Moreover, classical approaches employing lenses cannot control the spatial frequency of photons, such that classical approaches cannot reach the resolutions achievable through the employment of quantum mechanics.

Figure 1:
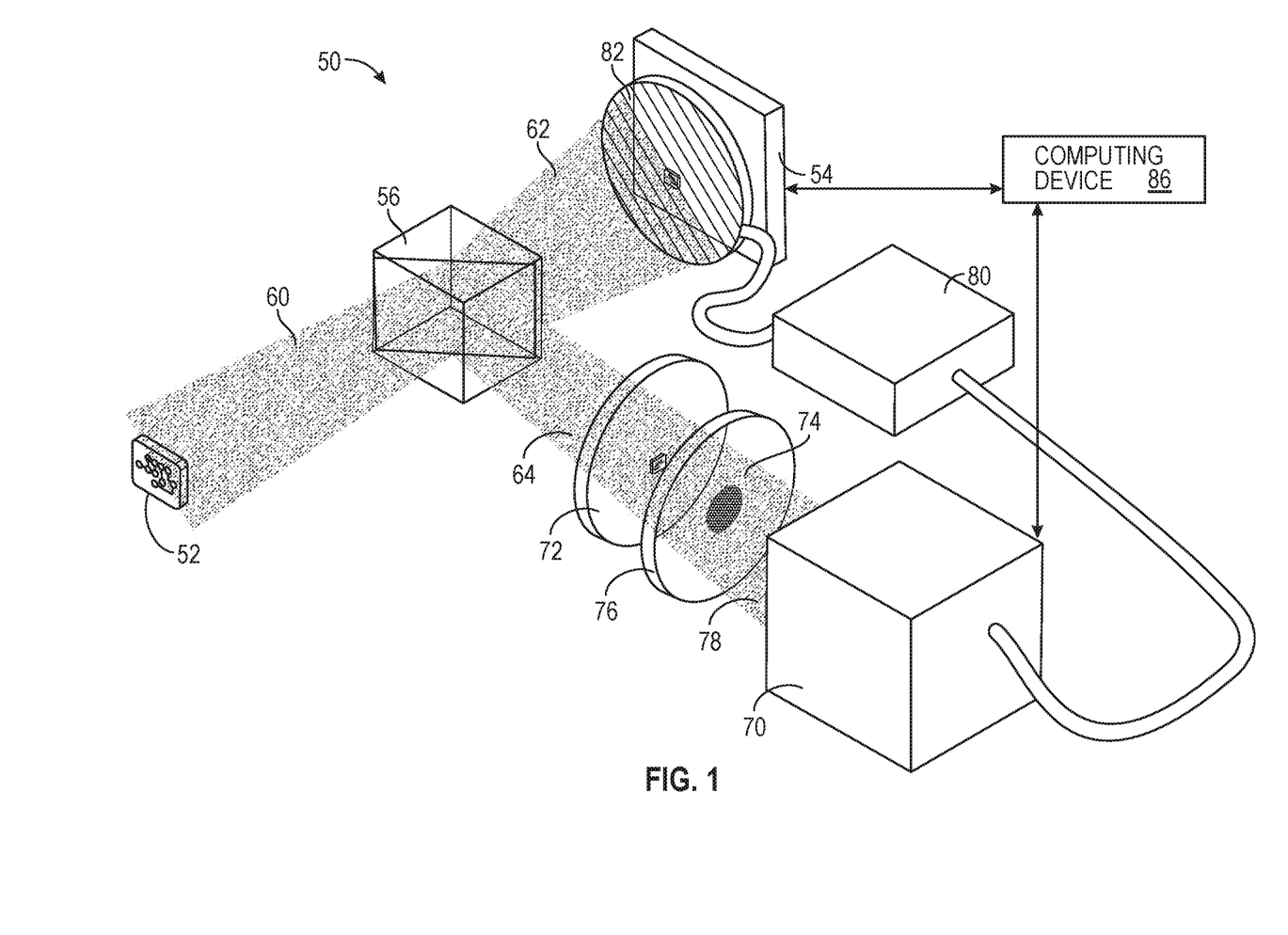
FIG. 1 illustrates an example of a system for projecting an image of an object on an image plane.

FIG. 1 illustrates an example of a system 50 for forming an image of an object 52 on an image plane 54 using non-classical imaging techniques, including quantum mechanics. The system 50 can include a beam splitter 56 positioned between the object 52 and the image plane 54. The image plane 54 can be a two dimensional photoresist plane (e.g., for lithography) or an array of optical detectors such as a two dimensional image plane (e.g., an image plane with two orthogonally arranged optical detectors), etc. In such an example, the array of optical detectors can be implemented as an array of photodiodes, charge-coupled devices (CCDs), avalanche photo diodes (APDs), etc. The beam splitter 56 is positioned to receive an input image beam 60. The input image beam 60 is an image of the object 52 with random phases of packets of photons. In some examples, the input image can be generated by a pseudo thermal light source, such as a laser.

The beam splitter 56 is configured to split the input image beam 60 into a first image beam 62 and a second image beam 64. The first image beam 62 can be directed toward the image plane 54. The second image beam 64 can be directed toward a bucket detector 70. The bucket detector 70 can be implemented, for example, with a single pixel detector (e.g., a photodetector). In some examples, the beam splitter 56 can divide the input image beam 60 into beams with different intensities. Stated differently, the beam splitter 56 can be configured to split the input image beam 60 into different proportions. For instance, the first image beam 62 could have about 75% of the intensity of the input image beam 60, and the second image beam 64 could have about 25% of the intensity of the input image beam 60. In other examples, the first image beam 62 and the second image beam 64 can have equal intensities (e.g., about 50% of the intensity of the input image beam 60).

A Fourier transform lens 72 can be situated along a light path formed by the second image beam 64. More particularly, the Fourier transform lens 72 can be positioned between the beam splitter 56 and the bucket detector 70. The Fourier transform lens 72 can transform the second image beam 64 into a Fourier image beam 74. The Fourier image beam 74 can be transmitted to a spatial filter 76 that operates as a filter to occlude (e.g., block) photons that have a low spatial frequency, which photons are clustered near a center of the spatial filter 76. The spatial filter 76 can be implemented on Fourier transform plane, namely the focal plane of the Fourier transform lens 72. The spatial filter 76 outputs a filtered Fourier image beam 78 to the bucket detector 70. Thus, photons in the filtered Fourier image beam 78 have an elevated probability of having a high spatial frequency relative to photons in the Fourier image beam 74 (prior to filtering).

The bucket detector 70 can be configured to provide a control signal to a switch 80. The switch 80 can be electrically coupled to an optical window 82 that is positioned in a light path formed by the first image beam 62. The switch 80 can control a state of the optical window 82. More particularly, the switch 80 can set the optical window 82 to a passing state, wherein the optical window is transparent (or nearly transparent) and light waves in the first image beam 62 are passed to the image plane 54. Alternatively, the switch 80 can set the optical window 82 to a blocking state, wherein light waves in the first image beam 62 are occluded (blocked or partially blocked) from transmission to the image plane 54.

In some examples, the optical window 82 can be implemented as an electro-optic modulator. In other examples, the optical window 82 can be implemented as an optical shutter. In still other examples, the optical window 82 can be implemented as a polarizing lens. In fact, the optical window 82 can be implemented with any optical device that includes a controllable aperture.

As an example where the optical window 82 is implemented as a first polarizing lens, the input image beam 60 can be light waves that have been linearly polarized in a particular direction by a second polarizing lens. In such a situation, in the passing state, the optical window 82 can be aligned parallel with the second polarizing lens (e.g., rotated or electrically activated) to allow light waves propagating in the same particular direction, such that the linearly polarized light waves pass to the image plane 54. Conversely, in the blocking state, the optical window 82 can be aligned (e.g., rotated or electrically activated) orthogonally to the second polarizing lens, thereby blocking light waves propagating in the particular direction.

The bucket detector 70 can be configured to de-assert the control signal during time intervals when the photon count of the filtered Fourier image beam 78 is below a threshold for a timeframe and to assert the control signal during intervals when the photon count of the filtered Fourier image beam 78 is above the threshold within the timeframe (e.g., 1 nanosecond). In the examples provided, assertion of the control signal include setting the control signal to a logical 1 and de-assertion of the control signal can include setting the control signal to a logical 0 if the switch 80 is configured with an active high switch. Conversely, assertion of the control signal include setting the control signal to a logical 0 and de-assertion of the control signal can include setting the control signal to a logical 1 if the switch 80 is configured with an active low switch.

In some examples, the threshold for the bucket detector 70 can be dynamic. In such a situation, the bucket detector 70 can include circuitry (e.g., an embedded controller) for calculating the threshold. In other examples, the threshold can be predetermined by an external computing device and hard-wired or programmed into the bucket detector 70. In still other examples, the threshold can be determined experimentally by adjusting the intensity and/or wavelength of the input image beam 60.

Because the bucket detector 70 receives the filtered Fourier image beam 78, the photons reaching the bucket detector 70 have a higher probability of having a high spatial frequency. Stated differently, because the second image beam 64 passes through the Fourier transform lens 72 and the spatial filter 76 (e.g., a blocking filter), photons that reach the bucket detector 70 have an elevated probability to have a high spatial frequency relative to the second image beam 64, which is prior to the second image beam 64 passing through the spatial filter 76. The bucket detector 70 is configured to assert the control signal to the switch 80 during time intervals where the number of photons with the elevated probability of having a high spatial frequency meets or exceeds the threshold within the timeframe (e.g., about 1 ns), which time intervals can be referred to as coincidence windows. In response to assertion of the control signal, the switch 80 causes the optical window 82 to switch to the passing state. Additionally, the bucket detector 70 is configured to de-assert the control signal during time intervals where the number of photons with the elevated probability of having a high spatial frequency is below the threshold level for the timeframe. In response to de-assertion of the control signal, the switch 80 causes the optical window 82 to switch to the blocking state.

In some examples, the spatial filter 76 can be omitted. For instance, in some examples, the bucket detector 70 can be implemented with an array of photodetectors that are selectively activated, and the bucket detector 70 is positioned at the focal plane of the Fourier transform lens 72. In such a situation, each photodetector can correspond to a pixel. Thus, the bucket detector 70 can be configured to count a number of photons detected at a subset of the pixels that are arranged outside of a center area of the bucket detector 70. In this example, photons detected for pixels near the center of the bucket detectors 70 are not counted toward the threshold level. In such an example, the bucket detector 70 can be positioned at the Fourier transform plane of the Fourier transform lens. In this manner, the bucket detector 70 can be configured to select any spatial frequency for the photons.

In the passing state, photons in the first image beam 62 are projected through the optical window 82 and toward the image plane 54. Furthermore, because the first image beam 62 and the filtered Fourier image beam 78 are correlated, the photons provided to the image plane 54 have an elevated probability of having a high spatial frequency. Stated differently, because the bucket detector 70 only asserts the control signal during intervals that the number of photons with an elevated probability of having a high spatial frequency reach the threshold, and the first image beam 62 and the filtered Fourier image beam 78 are correlated, the photons provided to the image plane 54 also have an elevated probability of having a high spatial frequency.

In examples where the image plane 54 is implemented with an array of optical detectors, the optical detectors are selected to have a response time sufficiently fast to trigger the changing of the state (e.g., passing to blocking or blocking to passing) of the optical window 82. In such as a situation, the image plane 54 can provide a digitized image signal to a computing device 86. The computing device 86 can be a general purpose computer, such as a desktop computer, a laptop computer, a tablet computer or a smart phone. The computing device 86 can include a non-transitory computer readable memory for storing data and/or machine readable instructions. The computing device 86 can also include a processing unit (e.g., one or more processor cores) that accesses the memory and executes the machine readable instructions. The computing device 86 can include machine readable instructions for storing the digitized image signal in the memory in response to receipt of the digitized image signal from the image plane 54. In examples where the image plane 54 is a photoresist plane, the computing device 86 may be omitted.

The digitized image signal can be a data signal representing a portion (e.g., one or more pixels) of the object 52 captured at the image plane 54. In some examples, the computing device 86 can command the bucket detector 70 and the image plane 54 to repeat the process to capture another portion of the object 52. Further, upon determining that a complete image of the object 52 has been captured, the computing device 86 can store the complete image of the object 52 in the memory.

The spatial frequency of images increases at boundaries within the image of the object 52 being generated on the image plane 54. Accordingly, limiting the photons passed to the image plane 54 to photons with an elevated probability of having a high spatial frequency improves the resolution of the image of the object 52 being generated at the image plane 54. Thus, by limiting the passing photons through the optical window 82 to coincidence windows wherein the photons have an elevated probability of having a high spatial frequency, the resolution of the image of the object 52 projected on the image plane 54 improves relative to a situation where the photons are provided to the image plane 54 indiscriminately (e.g., without regard to spatial frequency). More particularly, employment of the system 50 enables the image plane 54 to project a high-resolution image of the object 52 onto the image plane 54, which high resolution can be three (3) times greater (e.g., 4 times greater) than techniques that employ classical imaging techniques (e.g., optical lenses).

Figure 2:
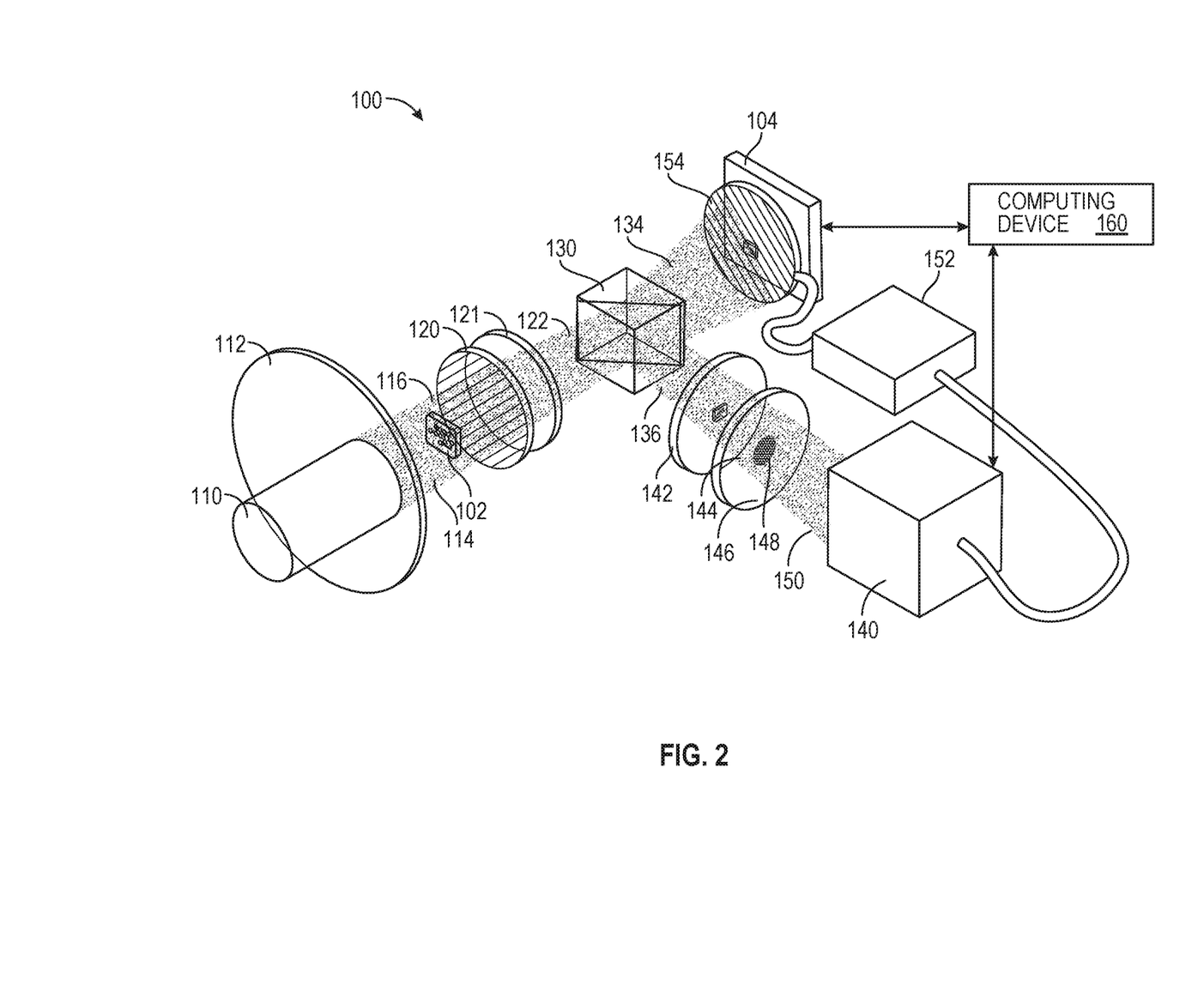
FIG. 2 illustrates another example of a system for projecting an image of an object on an image plane.

FIG. 2 illustrates another example of a system 100 that is employable to generate an image of an object 102 on an image plane 104 using non-classical imaging techniques, including quantum mechanics. The system 100 can be employed to implement the system 50 of FIG. 1. Furthermore, the object 102 in the present example is implemented as a photo mask for lithography. However, in other examples, other types of objects are employable.

In some examples, the image plane 104 can represent a two-dimensional photoresist plane (e.g., for use in lithography). In other examples, the image plane 104 can be an array of optical detectors, such as a two dimensional image plane (e.g., an image plane with two orthogonally arranged optical detectors). The array of optical detector could be implemented as photodiodes, CCDs, APDs, etc. In situations where the image plane 104 is an array of optical detectors, the image plane 104 can output a digitized image signal that represents an image captured by the image plane 104 (or some portion thereof).

The system 100 can include a pseudo-thermal light source 110, such as a laser. Light output by the pseudo-thermal light source 110 can propagate through a rotating diffuser structure 112 (e.g., a rotating lens) that randomizes phases of packets of photons to form a randomized light beam 114. The randomized light beam 114 is projected on the object 102 to form a randomized image beam 116, and the randomized image beam is directed toward a first polarizing lens 120. In some examples, an intensity and/or wavelength of the light generated by the pseudo-thermal light source 110 is controllable.

The first polarizing lens 120 is rotated to block light waves passing in a first direction, and to block light waves passing in a direction orthogonal to the first direction, and the light waves passing through the first polarizing lens 120 are directed toward an imaging lens 121 (e.g., a collimating lens), wherein the output of the imaging lens 121 is provided as an input image beam 122 for a beam splitter 130.

The beam splitter 130 is configured to split the input image beam 122 into a first image beam 134 and a second image beam 136. The first image beam 134 can be directed toward the image plane 104. The second image beam 136 can be directed toward a bucket detector 140. The bucket detector 140 can be implemented, for example, with a single pixel detector (e.g., a photodetector).

A Fourier transform lens 142 can be positioned along a light path formed by the second image beam 136. More particularly, the Fourier transform lens 142 can be positioned between the beam splitter 130 and the bucket detector 140. The Fourier transform lens 142 can transform the second image beam 136 into a Fourier image beam 144. The Fourier image beam 144 can be transmitted to a spatial filter 146. The spatial filter 146 can be implemented at a Fourier transform plane, namely the focal plane of the Fourier transform lens 142. The spatial filter 146 occludes (blocks or partially blocks) photons that have a low spatial frequency, which photons are clustered near a center of the spatial filter 146. More particularly, the spatial filter 146 includes an opaque region 148 at a center of the spatial filter 146 to occlude photons with low spatial frequency that tend to congregate near the center of the Fourier image beam 144. The spatial filter 146 outputs a filtered Fourier image beam 150 to the bucket detector 140. Thus, photons in the filtered Fourier image beam 150 have an elevated probability of having a high spatial frequency relative to photons randomly selected in the second image beam 136.

The bucket detector 140 can be configured to provide a control signal to a switch 152. The switch 152 can be electrically coupled to an optical window 154 that is positioned in a light path formed by the first image beam 134. The switch 152 can control a state of the optical window 154. More particularly, the switch 152 can set the optical window 154 to a passing state, wherein the optical window is transparent (or nearly transparent) and light waves in the first image beam 134 are passed to the image plane 104. Alternatively, the switch 152 can set the optical window 154 to a blocking state, wherein light waves in the first image beam 134 are blocked from transmission to the image plane 104.

In the example illustrated, the optical window 154 is implemented as a second polarizing lens that is controllable by the switch 152. In such an example, in the passing state, the optical window 154 is aligned (e.g., by rotation or electrically activated) parallel to the first polarizing lens 120, such that light waves propagating in the first direction pass through both the first polarizing lens 120 and the optical window 154 (a second polarizing lens). Conversely, in the blocking state, the optical window 82 can be aligned (e.g., rotated or electrically activated) orthogonally to the first polarizing lens 120, thereby blocking light waves propagating in the first direction. Moreover, because the first polarizing lens 120 blocks light waves propagating in the second direction, orthogonal to the first direction, most or all light waves are blocked by a combination of the first polarizing lens 120 and the optical window 154 (the second polarizing lens) that are aligned orthogonally relative to each other.

The bucket detector 140 can be configured to de-assert the control signal during time intervals when the photon count of the filtered Fourier image beam 150 is below a threshold for a timeframe (e.g., 1 ns) and to assert the control signal during time intervals when the photon count of the filtered Fourier image beam 150 is above the threshold for the timeframe. Furthermore, in some examples, intensities of light for a time interval can be determined experimentally. For instance the intensity of the second image beam 136 can be adjusted such that the photon count (e.g., corresponding to a mean light level) of the filtered Fourier image beam 150 provided to the bucket detector 140 during a timeframe (e.g., 1 ns) is about equal to a photon count per the image plane 104 (e.g., a 5 micrometer by 5 micrometer area). Adjustment to the second image beam 136 can occur, for example by adjusting an intensity of the light output by the pseudo-thermal light source 110.

In some examples, the threshold (and timeframe) for the bucket detector 140 can be dynamic. In such a situation, the bucket detector 140 can include circuitry (e.g., an embedded controller) for calculating the threshold. In other examples, the threshold can be predetermined by an external computing device and hard-wired or programmed into the bucket detector 140. In still other examples, the threshold can be determined experimentally.

Because the bucket detector 140 receives the filtered Fourier image beam 150, the photons reaching the bucket detector 140 have a higher probability of having a high spatial frequency than photons selected randomly from the second image beam 136. Stated differently, because the second image beam 136 passes through the Fourier transform lens 142 and the spatial filter 146 (e.g., a blocking filter), photons that reach the bucket detector 140 have an elevated probability to have a high spatial frequency relative to the second image beam 136, prior to the second image beam 136 passing through the Fourier transform lens 142 and the spatial filter 146.

In the passing state, photons in the first image beam 134 are passed through the optical window 154 and onto the image plane 104. Furthermore, because the first image beam 134 and the filtered Fourier image beam 150 are correlated, the photons received on the image plane 104 have an elevated probability of having a high spatial frequency. Stated differently, because the bucket detector 140 only asserts the control signal during time intervals that the number of photons with an elevated probability of having a high spatial frequency reach the threshold within the timeframe, and the first image beam 134 and the filtered Fourier image beam 150 are correlated, the photons received at the image plane 104 also have an elevated probability of having a high spatial frequency, as demonstrated by Equations 1 and 2, as explained herein.

More particularly, the system 100 leverages the principle that the filtered Fourier image beam 150 is correlated to the first image beam 134 provided to the image plane 104 (e.g., a photodetector). Thus, even after the Fourier transformation by the Fourier transform lens 142 and the filtering by the spatial filter 146, during time intervals where the number of photons in the filtered Fourier image beam 150 has reached the threshold for the timeframe, photons in the first image beam 134 have an elevated probability of having a high spatial frequency. The correlation between the filtered Fourier image beam 150 and the first image beam 134 can be quantified by Equation 1.

$$\left\langle \Delta I(\vec{\rho}_{i1}) \int d\vec{\rho}_{i2} \Delta I(\vec{\rho}_{i2}) \right\rangle \propto \left| \int d\vec{\rho}_o \int d\vec{\rho}_{i2} |A(\vec{\rho}_o)|^2 \right. \qquad \text{Equation 1}$$

$$\left. somb^2\left[\frac{\pi}{\lambda}\frac{D}{s_o}\left|\vec{\rho}_o - \frac{\vec{\rho}_{i2}}{\mu}\right|\right] somb^2\left[\frac{\pi}{\lambda}\frac{D}{s_o}\left|\vec{\rho}_o - \frac{\vec{\rho}_{i1}}{\mu}\right|\right] \right|^2$$

Wherein:
ΔI: intensity fluctuation of the second image beam;
$\vec{\rho}_{i1}$: transverse coordinate of a first detector on the image plane;
$\vec{\rho}_{i2}$: transverse coordinate of detector two on the image plane;
$\vec{\rho}_o$: transverse coordinate on the object plane of the object;
λ: wavelength of the light output by the pseudo-thermal light source;
D: diameter of the pseudo-thermal light source;
A: is the aperture function for the second polarizing lens;
$s_o$: distance from the radiation source to the object plane of the object;
µ: magnification factor of the imaging lens; and
somb is the sombrero function.

Conceptually, Equation 1 executes a convolution between the aperture function $(|A(\vec{\rho}_o)|^2)$ and the sombrero-like point-spread function $$\left(somb^2\left[\frac{\pi}{\lambda}\frac{D}{s_o}\left|\vec{\rho}_o - \frac{\vec{\rho}_{i2}}{\mu}\right|\right] somb^2\left[\frac{\pi}{\lambda}\frac{D}{s_o}\left|\vec{\rho}_o - \frac{\vec{\rho}_{i1}}{\mu}\right|\right]\right).$$

Moreover, Equation 1 demonstrates that intensity fluctuations (due to photons with a high spatial frequency) detected at the bucket detector are correlated to intensity fluctuations experienced by the image plane 104.

By leveraging the relationships quantified in Equation 1, Equation 2 can be derived:

$$\left\langle H(\Delta I(\vec{\rho}_{i1})) \int \Delta \vec{\kappa} d\vec{\rho}_{i2} \Delta I(\vec{\rho}_{i2}) \right\rangle \propto \left| \qquad \text{Equation 2} \right.$$

$$\left. \int d\vec{\rho}_o |A(\vec{\rho}_o)|^2 \, Img^2\left[\frac{\pi}{\lambda}\frac{D}{s_o}\left|\vec{\rho}_o - \frac{\vec{\rho}_{i1}}{\mu}\right|\right] \right|^2$$

Wherein:

$$H(x) = \begin{cases} 0 \text{ for } x < |x_0| \\ 1 \text{ for } x \geq |x_0| \end{cases}$$

$x_0$ is the threshold of photons with the elevated probability to have a high spatial frequency;
ΔI: intensity fluctuation of the second image beam;
$\vec{\rho}_{i1}$: transverse coordinate of a first detector on the image plane;
$\vec{\rho}_{i2}$: transverse coordinate of detector two on the image plane;
$\vec{\rho}_o$: transverse coordinate on the object plane of the object;
$\vec{\kappa}$ is the diameter of the opaque region of the spatial filter;
λ: wavelength of the light output by the pseudo-thermal light source;
D: diameter of the pseudo-thermal light source;
A: is the aperture function for the second polarizing lens;
$s_o$: distance from the radiation source to the object plane of the object;
µ: magnification factor of the imaging lens; and
Img is the image function.

As noted, the bucket detector 140 is configured to assert the control signal to the switch 152 during time intervals where the number of photons with the elevated probability of having a high spatial frequency meets or exceeds a threshold level, and each such time interval can be referred to as a coincidence time window. The threshold level can be selected to ensure that the optical window 154 is in the passing state only during time intervals where the intensity of the input image beam 122 deviates from a mean level by a significant margin (e.g., one standard deviation or more). In response to assertion of the control signal, the switch 152 causes the optical window 154 to switch to the passing state. Additionally, the bucket detector 140 is configured to de-assert the control signal during the coincidence time windows where the number of photons with the elevated probability of having a high spatial frequency is below the threshold level. In response to de-assertion of the control signal, the switch 152 causes the optical window 154 to switch to the blocking state. The coincidence time window can be about 1-10% of the time that the first image beam 134 is output toward the image plane 104 to ensure that the photon count received at the image plane 104 and detected by the bucket detector 140 is above the mean.

The spatial frequency of images increases at boundaries within the image of the object 102 (a photomask) being provided at the image plane 104. Accordingly, capturing photons with an elevated spatial frequency improves the resolution of the image of the object 102 being projected on the image plane 104. The duration of the coincidence time windows for capturing the photons on the image plane 104 can be based, for example on the light emitted from the pseudo-thermal light source 110. For example, if the light emitted from the pseudo-thermal light source 110 is a continuous wave (CW), the coincidence time window can be shorter (e.g., by at least three (3) orders of magnitude) than a coherent time of the CW field light propagated from the pseudo-thermal light source 110. By selecting the coincidence time window relative to the coherence time of the CW field, measured randomly paired photons or randomly paired two groups of randomly paired identical photons within the light propagated from the pseudo-thermal light source 110 are generated within the coherent time of the CW field for the light propagated from the pseudo-thermal light source 110.

Conversely, if the if the light emitted from the pseudo-thermal light source 110 is pulse-width modulated light, the pulse width is selected to be shorter (by at least three (3) orders of magnitude) than the coincidence time window. As one example, if the coincidence time window is set to 5 microseconds (μs), the pulse width should be about 5 nanoseconds (ns) or less. In this manner, the optical window 154 would be set to the passing state by the bucket detector 140 and the switch 152 for a time window that allows one optical pulse to pass through the optical window 154. Thus, random pairs of photons or randomly paired two groups of identical photons within light propagated from the pseudo-thermal light source 110 are generated within the coherent time window.

In examples where the image plane 104 is implemented as an array of optical detectors, the optical detectors are selected to have a response time sufficiently fast to trigger the changing of the state (e.g., passing to blocking or blocking to passing) of the optical window 154. In such as a situation, the image plane 104 can provide a digitized image signal to a computing device 160. The computing device 160 can be a general purpose computer, such as the computing device 86 of FIG. 1. The digitized image signal can be a digitized image signal representing a portion (e.g., one or more pixels) of object 102 captured at the image plane 104. In some examples, the computing device 86 can command the bucket detector 140 and the image plane 104 to repeat the process to capture another portion of the object 102. Further, upon determining that a complete image of the object 102 has been captured, the computing device 160 can store the complete image of the object 102 in the memory. In examples where the image plane 104 is implemented as a photoresist plane (e.g., in lithography), the computing device 160 may be omitted.

In some examples, the spatial filter 146 can be omitted, and the bucket detector 140 can be configured to selectively count photons with a particular threshold spatial frequency. For instance, in some examples, the bucket detector 140 can be implemented with an array of photodetectors that selectively activated and the bucket detector 140 can be positioned at a focal plane of the Fourier transform lens 142. Thus, the bucket detector 140 can be configured to count a number of photons detected at a subset of pixels that are arranged outside of a center area of the bucket detector 140, wherein the distance from the center of the bucket detector 140 corresponds to the spatial frequency of the received photons.

By limiting the passing of photons in the first image beam 134 to the image plane 104 during coincidence time windows wherein the photons have an elevated probability of having a high spatial frequency, the resolution of the image of the object 102 being projected on the image plane 104 improves relative to a situation where the image plane 104 receives photons indiscriminately (e.g., without regard to spatial frequency). Thus, capturing peaks of the intensity fluctuations (negative or positive) during the coincidence time windows allows a conditional image to be provided to the image plane 104 with an elevated resolution (e.g. three or more times (3) greater, such as four (3) times greater) than images generated with classical techniques.

Figure 3:
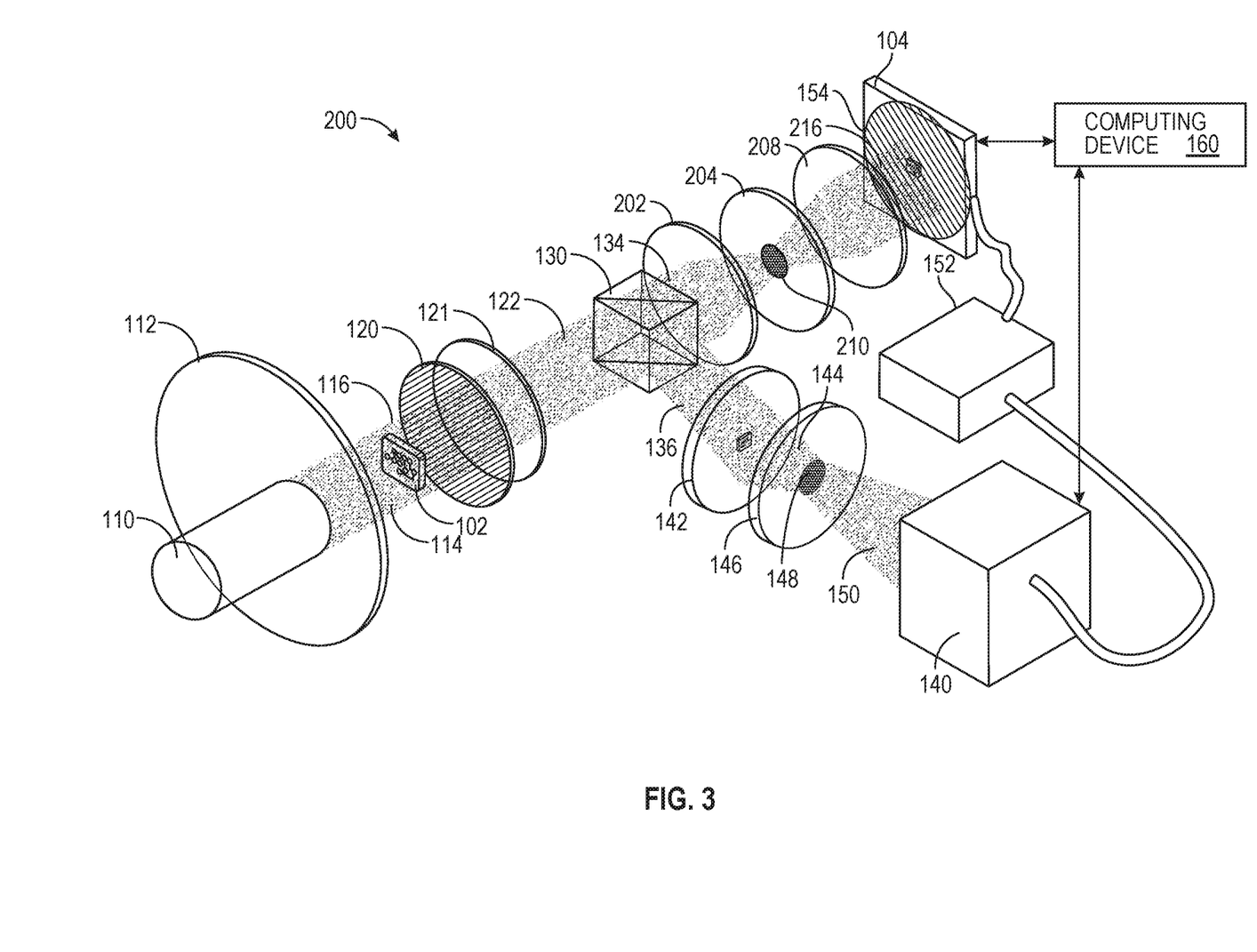
FIG. 3 illustrates yet another example of a system for projecting an image of an object on an image plane.

FIG. 3 illustrates yet another example of a system 200 for generating an image of the object 102 on the image plane 104. For purposes of simplification of explanation, FIGS. 2 and 3 employ the same reference numbers to denote the same structure. Additionally, not all components are re-introduced.

The imaging lens 121 in the input image beam 122 can be referred to as a first collimating lens 121 and the spatial filter 146 can be referred to as a first spatial filter 146. The system 200 is similar to the system 100 of FIG. 2, wherein the light path of the second image beam 136 is interrupted by a second collimating lens 202, a second spatial filter 204 and a third collimating lens 208. The second collimating lens 202 narrows the second image beam 136. The second spatial filter 204 is similar (or the same) as the first spatial filter 146. Thus, the second spatial filter 204 includes an opaque region 210 at a center of the second spatial filter 204 to occlude photons with a low spatial frequency. The third collimating lens 208 can parallelize light waves output from the second spatial filter 204 to provide a filtered first image beam 216 to the optical window 154 that is positioned in front of the image plane 104.

By inclusion of the second collimating lens 202, the second spatial filter 204 and the second collimating lens 202, intensities of high and low spatial frequency light are balanced. Thus, in some examples, the resolution of an image provided to the image plane 104 can be further elevated.

Figure 4:
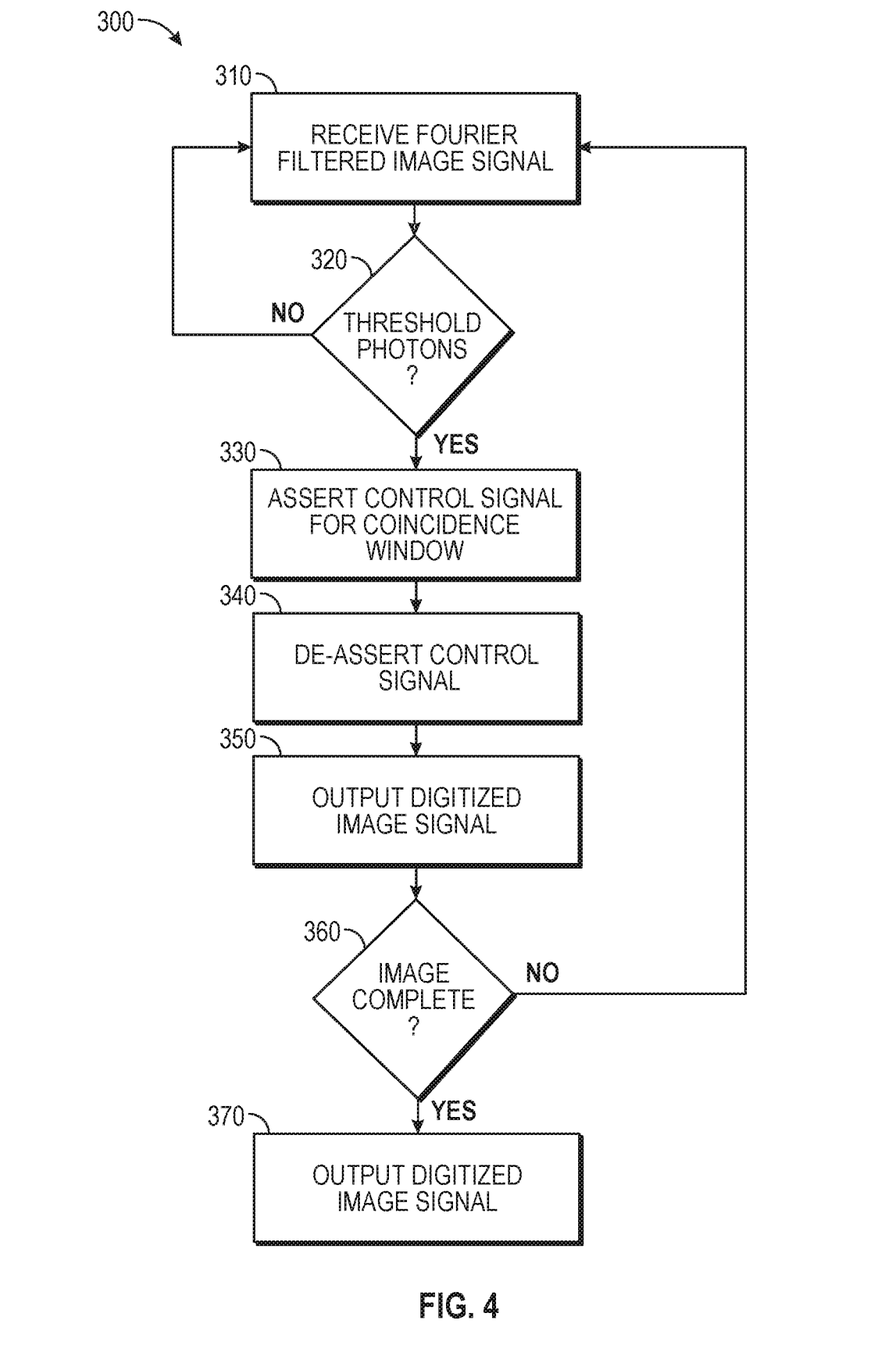
FIG. 4 illustrates a flowchart of an example method for projecting an image of an object on an image plane.

In view of the foregoing structural and functional features described above, example methods will be better appreciated with reference to FIG. 4. While, for purposes of simplicity of explanation, the example method of FIG. 4 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 4 illustrates a flowchart of an example method 300 for capturing an image of an object using principles of quantum mechanics (e.g., non-classical techniques). The method 300 can be implemented, for example, by the system 50 of FIG. 1, the system 100 of FIG. 2 and/or the system 200 of FIG. 3. At 310, a bucket detector (e.g., the bucket detector 70 of FIG. 1) can receive a filtered Fourier image beam of an object (e.g., the filtered Fourier image beam 78 of FIG.

1). As discussed herein, the photons in the filtered Fourier image beam have an elevated probability of having a high spatial frequency. Further, the filtered Fourier image beam is correlated with an object image beam provided toward an image plane (e.g., the image plane 54 of FIG. 1). At 320, a determination can be made as to whether a threshold number of photons has been detected by the bucket detector 70 in a timeframe (e.g., 1 ns). If the determination is negative (e.g., NO), the method 300 returns to 310. If the determination is positive (e.g., YES), the method 300 proceeds to 330.

At 330, the bucket detector asserts a control signal to a switch (e.g., the switch 80 of FIG. 1) that causes an optical window (e.g., the optical window 82) to switch to a passing state. In the passing state, the optical window allows the object image beam (e.g., the first image beam 62 of FIG. 1) to pass to the image plane during a coincidence window. After the coincidence window has expired, at 340, the bucket detector de-asserts the control signal, which in turn causes the switch to switch the optical window to a blocking state.

At 350, the image plane provides a digitized image signal to a computing device (e.g., the computing device 86 of FIG. 1). In response, at 360 the computing devices makes determination is made as to whether the image is complete. If the determination at 360 is negative, the method 300 returns to 310. If the determination at 360 is positive (e.g., YES), the method 300 proceeds to 370. At 370, the computing device stores an image of the object.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system for projecting an image of an object on an image plane, the system comprising:
   a beam splitter that outputs a first image beam and a second image beam in response to an input image beam, wherein the input image beam comprises an image of an object;
   a Fourier transform lens aligned to receive the second image beam and to transform the second image beam into a Fourier image beam; and
   a bucket detector that is aligned in a light path of the Fourier image beam, wherein the bucket detector asserts a control signal in response to detecting a threshold number of photons with an elevated probability of having a high spatial frequency within a timeframe and to de-assert the control signal in response to detecting less than the threshold number of photons with an elevated probability of having a high spatial frequency within the timeframe, assertion and de-assertion of the control signal controls a state of an optical window aligned to receive the first image beam and the optical window allows the first image beam to pass to an image plane in a passing state and the optical window blocks of the first image beam in a blocking state.

2. The system of claim 1, further comprising:
   a switch connected to the optical window and the bucket detector, wherein the switch sets the optical window to switch to the passing state in response to assertion of the control signal and the switch sets the optical window to switch to the blocking state in response to de-assertion of the control signal.

3. The system of claim 1, wherein the beam splitter is configured to split the input image beam into uneven proportions.

4. The system of claim 1, wherein the optical window is a first polarizing lens that blocks light waves propagating in a first direction in the blocking state and allows light waves propagating in the first direction to pass to the image plane in the passing state, the image plane system further comprising:
   a second polarizing lens positioned between the object and the beam splitter, wherein the second polarizing lens blocks light waves propagating in a second direction, wherein the second direction is orthogonal to the first direction.

5. The system of claim 4, further comprising an imaging lens positioned between the second polarizing lens and the beam splitter, wherein the imaging lens collimates light waves directed toward the beam splitter.

6. The image plane system of claim 4, further comprising a pseudo-thermal light source that generates a light beam projected onto the object, wherein an intensity of the pseudo-thermal light source is controllable.

7. The system of claim 1, wherein the optical window is an electro-optic modulator.

8. The system of claim 1, wherein the optical window is a Pockels cell or an optical shutter.

9. The system of claim 1, wherein the bucket detector is positioned at a Fourier transform plane of the Fourier transform lens, and the bucket detector comprises an array of photodetectors, wherein each photodetector corresponds to a pixel and the bucket detector is configured to count photons detected for a subset of pixels outside a center area as photons with an elevated probability of having a high spatial frequency.

10. The system of claim 1, further comprising a spatial filter aligned to receive the Fourier image beam and occlude photons with a low spatial frequency to provide a filtered Fourier image beam, wherein the spatial filter includes an opaque region at a center of the spatial filter.

11. The system of claim 10, wherein the spatial filter is a first spatial filter, the system further comprising:
   a second spatial filter positioned between the optical window and the beam splitter.

12. The system of claim 1, wherein the object is a photo mask and the image plane is a photoresist image plane.

13. A system for projecting an image of an object on an image plane, the system comprising:
   a pseudo-thermal light source that outputs light with random phases of packets of photons;
   a beam splitter that outputs a first image beam and a second image beam in response to an input image beam that includes an image of an object situated between the pseudo-thermal light source and the beam splitter;
   a Fourier transform lens aligned to receive the second image beam and to transform the second image beam into a Fourier image beam;

a spatial filter aligned to receive the Fourier image beam and occlude photons with a low spatial frequency to provide a filtered Fourier image signal; and a bucket detector that is aligned to receive the filtered Fourier image beam, wherein the bucket detector asserts a control signal in response to detecting a threshold number of photons within a timeframe and to de-assert the control signal in response to detecting less than the threshold number of photons within the timeframe, assertion and de-assertion of the control signal controls a state of an optical window aligned to receive the first image beam and the optical window allows light waves of the first image beam to pass to an image plane in a passing state and the optical window blocks light waves of the first image beam in a blocking state.

14. The system of claim 13, further comprising:
a switch connected to the optical window and the bucket detector, wherein the switch sets the optical window to the blocking state in response to assertion of the control signal and the switch sets the optical window to the passing state in response de-assertion of the control signal.

15. The system of claim 13, wherein the spatial filter is a first spatial filter, the system further comprising:
a second spatial filter positioned between the beam splitter and the image plane.

16. The system of claim 13, wherein the optical window is a first polarizing lens that blocks light waves propagating in a first direction in the blocking state and that allows light waves propagating in the first direction to pass to the image plane in the passing state, the image plane system further comprising:
a second polarizing lens positioned between the object and beam splitter, wherein the second polarizing lens blocks light waves propagating in a second direction, wherein the second direction is orthogonal to the first direction.

17. The system of claim 13, wherein the beam splitter splits the input image beam in uneven proportions.

18. The system of claim 13, wherein the optical window is one of an electro-optic modulator, a Pockels cell and an optical shutter.

19. A method for projecting an image on an image plane, the method comprising:
receiving, at a bucket detector, a filtered Fourier image beam that is correlated with an object image beam directed to an image plane, wherein photons in the filtered Fourier image beam have an elevated probability of having a high spatial frequency;

detecting, at the bucket detector, a threshold number of photons in the filtered Fourier image beam within a timeframe; and asserting, in response to the detecting, a control signal that causes an optical window to switch to a passing state to allow light waves in the object image beam to pass to the bucket detector.

20. The method of claim 19, wherein the optical window is one of an electro-optic modulator, a Pockels cell and an optical shutter.

* * * * *